JOHN KLEPZIG, OF SAN FRANCISCO, CALIFORNIA.

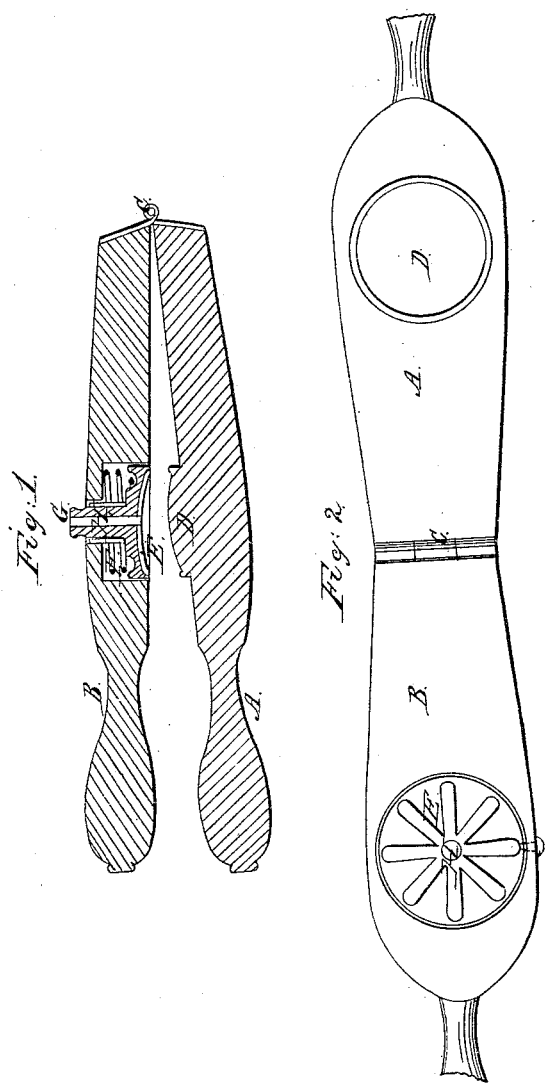
J. Klepzig,
Lemon Squeezer.
N° 84,125        Patented Nov. 17, 1868.
Witnesses:
Geo. H. Strong
Jno. L. Boone
Inventor,
John Klepzig
By his Atty's,
Dewey & Co.

Letters Patent No. 84,125, dated November 17, 1868.

IMPROVED LEMON-SQUEEZER.

The Schedule referred to in these Letters Patent and making part of the same.

*To all whom it may concern:*

Be it known that I, JOHN KLEPZIG, of the city and county of San Francisco, State of California, have invented an Improved Lemon-Squeezer; and I do hereby declare the following description and accompanying drawings are sufficient to enable any person skilled in the art or science to which it most nearly appertains, to make and use my said invention or improvement without further invention or experiment.

The object of my invention is to provide an improved lemon-squeezer, and consists in forming an opening in one of the squeezing-levers. A movable button, which is operated by a spiral spring, is placed in the opening, and, by placing the fruit between the two levers, and closing them, the juice is expressed, through the hole in the bottom, into the tumbler, while the rind of the lemon is pressed closely against the face of the button-lever, completely enclosing the button.

To more fully illustrate and describe my invention, reference is had to the accompanying drawings, and the letters marked thereon, of which—

Figure 1 is a side sectional elevation.
Figure 2 is a view showing the levers open.

A and B are the two levers, connected by a hinge, C. The lever A has a projection, D, so that when the two levers are shut together, the small end of the button E, which sets in the openings in the lever B, is forced out.

The opening in the lever is of less diameter on the back than on the face, and has a ledge, on which a spiral spring, F, rests, the small end or tube, G, attached to the button, passing through this lesser hole.

The segregated half of the fruit is placed against the spring-button, and the opposite lever, having the projection, is brought down upon the small end, which presses the rind down upon the smooth surface of the button-lever, completely surrounding the button, and bearing down the spring, which forces out the stem, while the juice of the fruit passes through the centre hole, H, into the tumbler. The face of the button is concave and has grooves centring to the opening.

Having thus described my invention,

What I claim, and desire to secure by Letters Patent, is—

The movable button E, with its opening, H, the spiral spring F, in combination with the two levers A and B, operating substantially as and for the purpose specified.

In witness whereof, I have hereunto set my hand and seal.

JOHN KLEPZIG. [L. S.]

Witnesses:
GEO. H. STRONG,
JNO. L. BOONE.